(12) United States Patent
Brogan et al.

(10) Patent No.: US 6,292,723 B1
(45) Date of Patent: Sep. 18, 2001

(54) EMBEDDED ENGINE DIAGNOSTIC SYSTEM

(75) Inventors: Christopher J. Brogan, Cincinnati; Bryson M. Pursell, Lebanon; Steven J. Matchett, Hamilton, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/410,238

(22) Filed: Sep. 30, 1999

(51) Int. Cl.$^7$ .................................................. B60G 17/08
(52) U.S. Cl. .............................. 701/29; 701/31; 701/35
(58) Field of Search ............................... 701/29, 31, 32, 701/34, 35; 73/116, 117.4

(56) References Cited

U.S. PATENT DOCUMENTS

| | | | |
|---|---|---|---|
| 3,731,070 | * 5/1973 | Urban | 73/116 |
| 4,587,614 | * 5/1986 | Couch | 701/29 |
| 4,625,280 | * 11/1986 | Couch | 701/29 |
| 5,018,069 | 5/1991 | Pettigrew . | |
| 5,408,412 | 4/1995 | Hogg et al. . | |
| 5,951,611 | 9/1999 | La Pierre . | |

* cited by examiner

*Primary Examiner*—Richard M. Camby
(74) *Attorney, Agent, or Firm*—Andrew C. Hess; Rodney M. Young

(57) ABSTRACT

An exemplary embodiment of the invention is an engine diagnostic system including a plurality of sensors. One of the plurality of sensors includes a speed sensor generating a speed value indicative of aircraft speed. A processor is coupled to the sensors and stores prior mission data and current mission data in a data memory when the speed value is within a predetermined velocity range. A fault indicator is provided which is visible from the exterior of the aircraft. The processor detects a presence or absence of a fault in response to the prior mission data and current mission data and activates the fault indicator in response to the presence of a fault. Another exemplary embodiment of the invention is a method for detecting faults in an aircraft. The method includes determining when aircraft speed is within a predetermined velocity range and obtaining current mission data in response to the aircraft speed being within the velocity range. The presence or absence of a fault is detected in response to the prior mission data and current mission data. A fault indicator is activated in response to said presence of the fault.

24 Claims, 4 Drawing Sheets

| PARAMETER | VALUE |
|---|---|
| THROTTLE POSITION | 100 |
| SPEED | 0.30 |
| FAN PRESSURE | 70 |

EMBEDDED ENGINE DIAGNOSTIC SYSTEM

STATEMENT REGARDING FEDERALLY SPONSORED RESEARCH AND DEVELOPMENT

The U.S. Government may have certain rights in this invention pursuant to contract numbers F33657-95-C-0055 and F33657-97-C-0016.

BACKGROUND OF THE INVENTION

The invention relates generally to engine diagnostic systems and in particular to an engine diagnostic system which is embedded in the aircraft and does not require external systems to detect a fault. The U.S. Air Force currently downloads mission data from each F-16 at the end of each day. The data is transferred to portable data transfer devices and subsequently downloaded into ground support systems. This data is then compared to previous mission data and performance faults are determined based on trend data. The support equipment infrastructure has been unreliable and expensive to maintain.

This system requires significant maintenance manpower resources and exposes the engine and aircraft to the potential of undetected trend faults due to ground system equipment related problems. In addition, the existing system would not enunciate a trend fault until the end of the day which could be after multiple missions. In a deployed scenario, the support equipment must be transported to the remote site to determine if a performance fault exists.

BRIEF SUMMARY OF THE INVENTION

An exemplary embodiment of the invention is an engine diagnostic system including a plurality of sensors. One of the plurality of sensors includes a speed sensor generating a speed value indicative of aircraft speed. A processor is coupled to the sensors and stores current mission data in a data memory when the speed value is within a predetermined velocity range. A fault indicator is provided which is visible from the exterior of the aircraft. The processor detects a presence or absence of a fault in response to the current mission data and activates the fault indicator in response to the presence of a fault.

Another exemplary embodiment of the invention is a method for detecting faults in an aircraft. The method includes determining when aircraft speed is within a predetermined velocity range and obtaining current mission data in response to the aircraft speed being within the velocity range. The presence or absence of a fault is detected in response to the current mission data. A fault indicator is activated in response to the presence of the fault.

DETAILED DESCRIPTION OF THE INVENTION

Figures 1, 3:
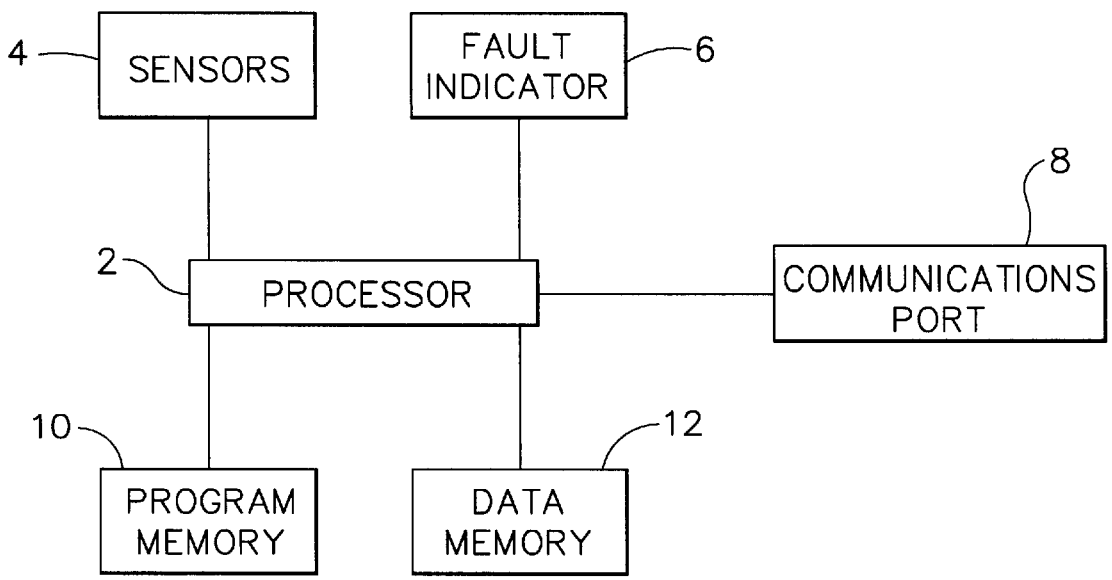
FIG. 1 is a block diagram of an embedded engine diagnostic system in an exemplary embodiment of the invention.
FIG. 3 depicts an exemplary data record.

FIG. 1 is a block diagram of an embedded engine diagnostic system in an exemplary embodiment of the invention. The embedded engine diagnostic system includes a processor 2 which executes the diagnostic process described herein with reference to FIGS. 2A and 2B. Processor 2 may be implemented using existing microprocessors. Sensors 4 are coupled to the processor 2 and provide values for engine parameters (such as fuel rate) and/or aircraft parameters (such as Mach number) to the processor 2. A program memory 10 is a non-volatile memory which contains the program to be executed by the processor 2. The program memory 10 may be electrically programmable (such as an EEPROM) so that the program to be executed by processor 2 can be updated. A data memory 12 stores current mission data and prior mission data for a plurality of prior missions which are used to detect faults as described herein. The data memory 12 may be implemented using known non-volatile memory. A communications port 8 is coupled to processor 2 and is used to upload configuration data (e.g., aircraft type, engine type, etc.) or download configuration data and mission data from data memory 12. The communications port 8 may use existing communications protocols such as RS232. The communications port 8 is preferably accessible from the exterior of the aircraft.

Upon detection of a fault, the processor activates a fault indicator 6. The fault indicator 6 may include an indicator visible by the pilot (e.g., an LED in the cockpit) and an indicator visible from the exterior of the aircraft (e.g., an LED or mechanical device at the wheel well strut). Providing a direct indication of a fault on the exterior of the aircraft eliminates the need to download mission data to ground systems to detect a fault and provides fault detection for each mission.

Figure 2A:
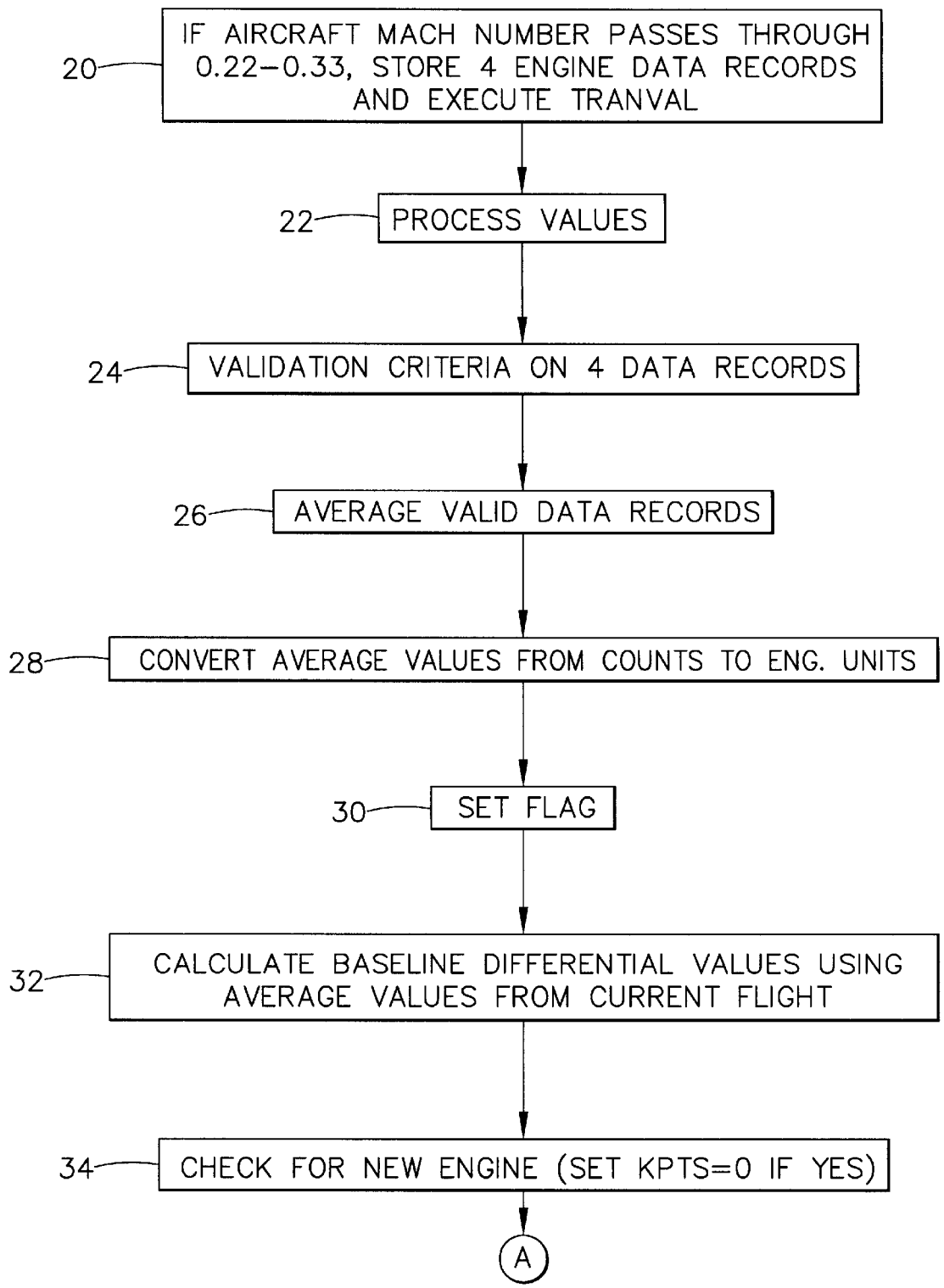
FIGS. 2A and 2B depict a flowchart of the processing performed by the embedded engine diagnostic system in an exemplary embodiment of the invention.
Figure 2B:
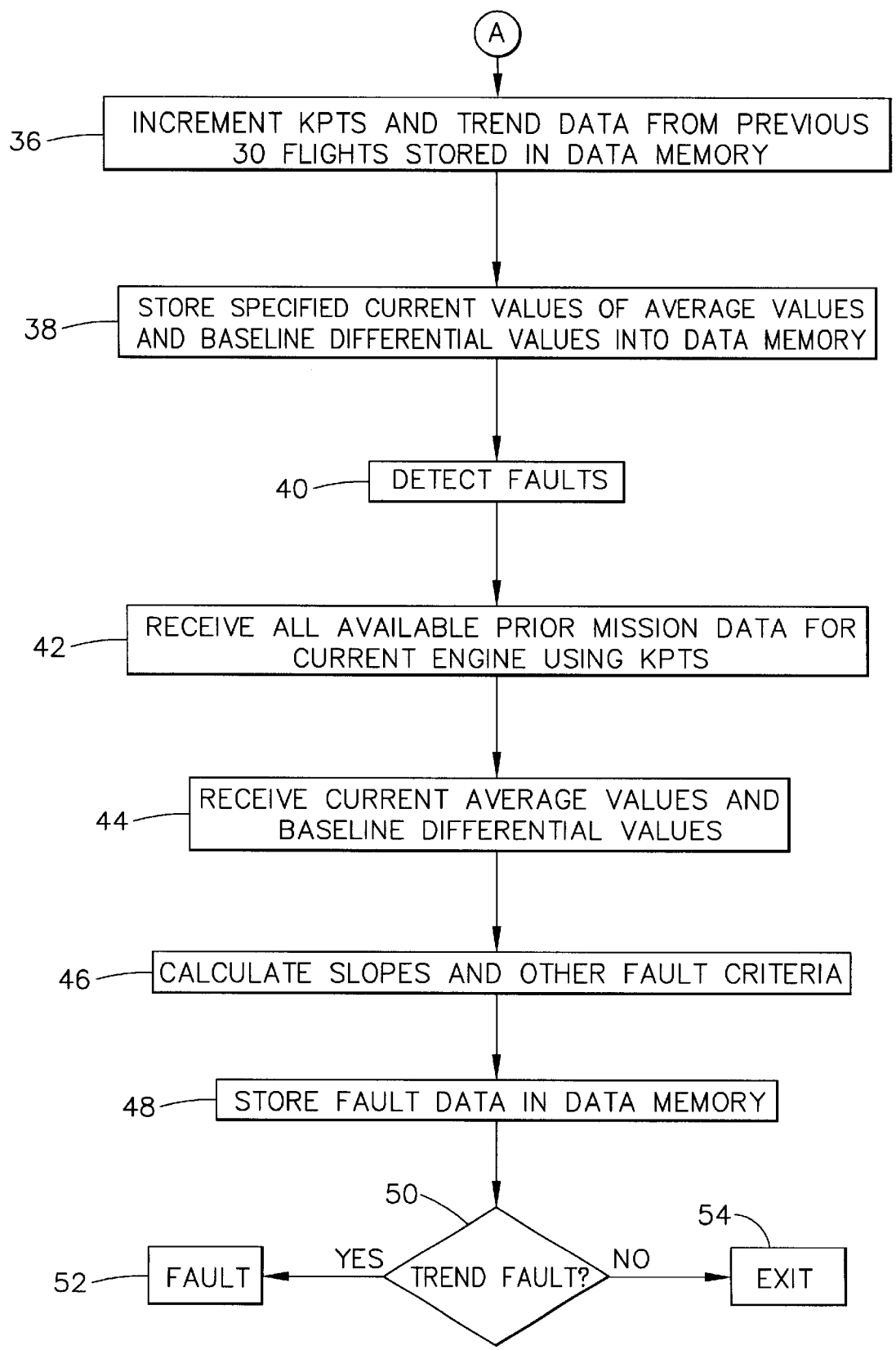

FIGS. 2A and 2B depict a flowchart of the processing performed by the embedded engine diagnostic system in an exemplary embodiment of the invention. In the embodiment shown in FIGS. 2A and 2B, the embedded engine diagnostic system is programmed to detect faults during take-off. It is understood that other processes may be performed by the embedded engine diagnostic system. The process begins at step 20 where the aircraft speed is monitored to detect when the aircraft is within a velocity range. An exemplary velocity range is about Mach 0.22 to about Mach 0.33. In this speed range, the aircraft is in the take-off process and the engine is in a stable state and up to normal operating temperature. When the aircraft is within this velocity range, the embedded engine diagnostic system sequentially acquires a plurality of data records (e.g., four). Acquiring data under uniform conditions (e.g., within a predetermined velocity range) results in more accurate detection of faults. The multiple data records are separated by a sampling interval (e.g., ½ second). Each of the data records contains values indicative of parameters including engine parameters or aircraft parameters. An exemplary data record is shown in FIG. 3 which depicts the parameters sensed by sensors 4 and the values for each parameter.

Once the multiple data records are acquired, the process may pause for a period of time (e.g., three minutes) prior to proceeding to step 22. The embedded engine diagnostic system will generate a fault indication in the cockpit through fault indicator 6. Activation of the fault indicator may be delayed until the aircraft completes takeoff.

At step 22, the value processing routine is initiated to preprocess the sensor data acquired at step 20 prior to detection of faults. At step 24, a validation routine is performed on the values in each of the data records. The validation routine may apply various tests to determine if the sampled data is appropriate for detecting faults. The goal is to confirm that the values in each data record are suitable for detecting faults. Because the embedded engine diagnostic system compares current mission data to prior mission data to generate faults, the current mission data is validated to ensure an accurate comparison. An exemplary validation is confirming that a value for a parameter has remained constant over the multiple samplings. For example, for accurate comparison to past missions, it may be necessary that the throttle position remain constant for all data records. Another exemplary validation is confirming that values for a parameter are within a predetermined range. If the values in the data records fail validation, the process is ended.

Once the values in each data record are validated, a single average data record is generated at step 26. The average data record which contains an average value, derived from the multiple data records, for each parameter. At 28, the average values are converted into the appropriate engineering units if necessary. The sensors 4 may generate signals in terms of abstract units (e.g., voltage, counts per second, etc.). At step 28, these abstract units are converted to engineering units (e.g., pressure, speed, etc.) due to the fact that the fault detection in an exemplary embodiment of the invention is performed based on engineering units.

Once step 28 is completed, a flag is set at step 30 to indicate that the acquired values are suitable for processing to detect faults. At 32, baseline differential values are determined for each parameter in the average data record. A baseline differential value indicates the difference between an average value from a sensor and a predicted new engine, baseline value (e.g., predicted from a model or other source). The baseline differential value can be represented in a variety of ways including a difference (i.e., Xsensed–Xpredicted) or a ratio (i.e., Xsensed/Xpredicted).

At step 34, it is determined whether the engine is new. Designating an engine as new sets a mission history counter kpts to zero indicating that no prior mission data stored in memory is to be used in detecting faults. An engine may be classified as new upon a variety of conditions including initial installation, maintenance, retrofit, etc. Prior mission data is saved as the new engine completes missions. Until prior mission data is available, the embedded engine diagnostic system detects a limited number of faults that do not require prior mission data for detection.

At step 36, the kpts counter is incremented and prior mission data is incremented to create space for the current mission data In effect, the prior mission data is stored in a first-in, first-out manner in which mission data beyond the thirty past missions is removed from memory. Once the memory is shifted in step 36, the current mission data (i.e., average values and baseline differential values) is stored in step 38.

Once the prior mission data has been updated to remove mission data beyond thirty prior missions and the current mission data has been stored, the embedded engine diagnostic system initiates a fault detection process as shown at step 40. A step 42, all available prior mission data (i.e., prior average values and prior baseline differential values for each parameter) is retrieved. At step 44, the current average values and current baseline differential values for each parameter are retrieved. This prior mission data and current mission data are processed to detect faults in step 46. A variety of faults can be detected by the embedded engine diagnostic system in response to current mission data and prior mission data. For example, a leak in a compressor line is detected if the compressor bleed pressure drops by more than 25 psi for two consecutive missions. Flow path deterioration is detected if the turbine exit temperature (T4B) increases faster than a predetermined rate. It is understood that a variety of faults may be detected and the invention is not limited to the examples disclosed herein.

Figure 4:
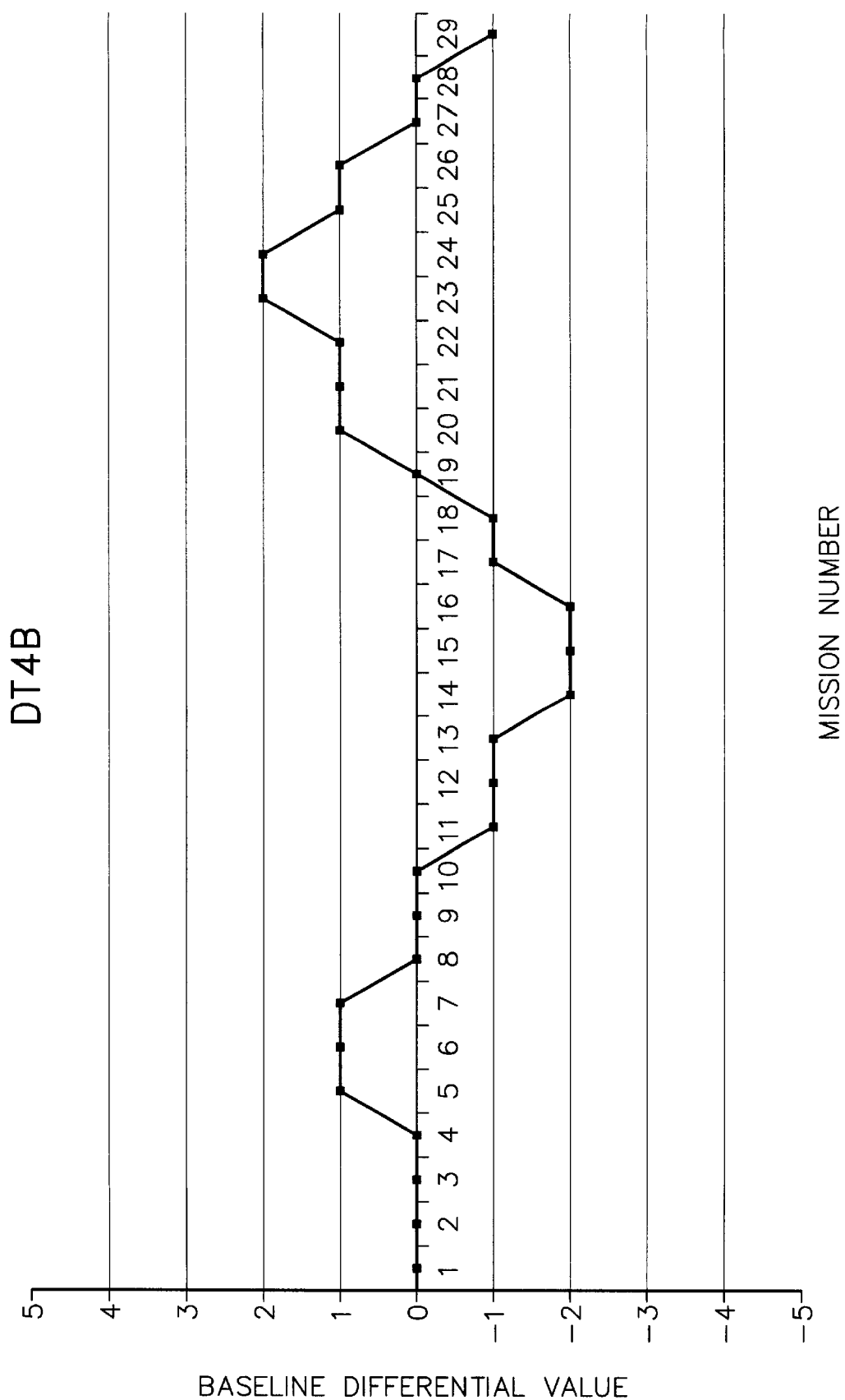
FIG. 4 is a plot of baseline differential value versus mission number for an engine parameter.

FIG. 4 depicts the detection of faults based on baseline differential values. FIG. 4 depicts baseline differential values (shown as a difference between the average value and the predicted new engine, baseline value) versus mission number for turbine exit temperature (DT4B). As shown in FIG. 4, the baseline differential value DT4B varies over missions. One technique used for detecting a fault is computing the slope of the baseline differential value plot. A large slope may indicate a fault. Another technique used for detecting a fault is computing the slopes of both the T4B and corrected operating point (PHI) baseline differential value plots. A large slope on both indicates a higher probability of a real fault. Other known fault criteria may be applied to detect faults such as an average value exceeding a threshold. Other known techniques may be used to detect faults based on the mission data. Existing techniques to reduce the occurrence of false fault indications may also be used.

Referring to FIG. 2, once fault detection is performed at step 46, fault data indicative of the absence or presence of a fault is stored in the data memory 12. An exemplary technique for recording the occurrence of a fault is to store a one or zero in a memory location corresponding to a fault. If a one is stored in the memory location, this indicates that the corresponding fault was detected. At step 50, the stored fault data is examined to determine the existence of a fault. Step 50 may perform a logical OR operation on the values in the fault memory locations so that any one fault will result in activating the fault indicator 6. If a fault is detected, the fault indicator 6 is activated at step 52, otherwise the routine exits at step 54. As noted above, the fault indicator 6 may include a visual indicator in the cockpit for the pilot (e.g., an LED) and a visual indicator which is visible from the outside of the aircraft (e.g., an LED or mechanical device). The specific cause of the fault can be detected directly next to the aircraft by using a data transfer and display device (e.g., a portable computer).

The embedded engine diagnostic system eliminates the need to download data from each aircraft each day. The embedded engine diagnostic system also provides continuous monitoring of faults throughout each mission and is not degraded by ground system equipment failures.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. An engine diagnostic system comprising:
   a plurality of sensors, one of said plurality of sensors including a speed sensor generating a speed value indicative of aircraft speed;
   a data memory;
   a processor coupled to said sensors, said processor storing current mission data in said data memory when said speed value is within a predetermined velocity range; and,
   a fault indicator visible from the exterior of the aircraft;
   said processor detecting a presence or absence of a fault in response to said current mission data and activating said fault indicator in response to said presence of a fault.

2. The engine diagnostic system of claim 1 wherein:
   said current mission data includes values for parameters and baseline differential values for said parameters.

3. The engine diagnostic system of claim 2 wherein:
   said parameters include aircraft parameters and engine parameters.

4. The engine diagnostic system of claim 2 wherein:
   said values include average values.

5. The engine diagnostic system of claim 1 wherein:
   said data memory includes prior mission data; and
   said processor detects the presence or absence of a fault in response to said current mission data and said prior mission data.

6. The engine diagnostic system of claim 2 wherein:
   said processor validates said values prior to detecting the presence or absence of a fault.

7. The engine diagnostic system of claim 1 wherein:
   said fault indicator includes a visual indicator visible to a pilot.

8. The engine diagnostic system of claim 1 wherein:
   said velocity range is about Mach 0.22 to about Mach 0.33.

9. A method for detecting faults in an aircraft comprising the steps of:
   determining when aircraft speed is within a predetermined velocity range;
   obtaining current mission data in response to the aircraft speed being within said velocity range;
   detecting a presence or absence of a fault in response to current mission data; and
   activating a fault indicator in response to said presence of a fault.

10. The method of claim 9 wherein:
    said current mission data includes values for parameters and baseline differential values for said parameters.

11. The method of claim 10 wherein:
    said parameters include aircraft parameters and engine parameters.

12. The method of claim 10 wherein:
    said values include average values.

13. The method of claim 9 further comprising the step of:
    storing prior mission data;
    wherein said detecting the presence or absence of a fault is in response to said current mission data and said prior mission data.

14. The method of claim 10 further comprising the step of:
    validating said values prior to detecting the presence or absence of a fault.

15. The method of claim 9 wherein:
    said fault indicator is visible from the exterior of the aircraft.

16. The method of claim 9 wherein:
    said fault indicator includes a visual indicator visible to a pilot.

17. The method of claim 9 wherein:
    said velocity range is about Mach 0.22 to about Mach 0.33.

18. A storage medium encoded with machine-readable computer program code for detecting faults in an aircraft, the storage medium including instructions for causing a computer to implement:
    determining when aircraft speed is within a predetermined velocity range;
    obtaining a plurality of values indicative of parameters in response to the aircraft speed being within said velocity range;
    detecting a presence or absence of a fault in response to said plurality of values; and
    activating a fault indicator in response to said presence of a fault.

19. The storage medium of claim 18 wherein:
    said plurality of values include values for parameters and baseline differential values for said parameters.

20. The storage medium of claim 19 wherein:
    said parameters include aircraft parameters and engine parameters.

21. The storage medium of claim 19 wherein:
    said values include average values.

22. The storage medium of claim 18 further comprising program code for causing the computer to implement:
    storing prior mission data;
    wherein said detecting a presence or absence of a fault is in response to said current mission data and said prior mission data.

23. The storage medium of claim 19 further comprising program code for causing the computer to implement:
    validating said values prior to detecting a presence or absence of a fault.

24. The storage medium of claim 18 wherein:
    said velocity range is about Mach 0.22 to about Mach 0.33.

* * * * *